United States Patent [19]

Minn

[11] Patent Number: 5,049,652

[45] Date of Patent: Sep. 17, 1991

[54] USE OF A MIXED CATALYST SYSTEM TO IMPROVE THE VISCOSITY STABILITY OF ROSIN RESINS

[75] Inventor: James Minn, Hattiesburg, Miss.

[73] Assignee: Hercules Incorporated, Wilmington, Del.

[21] Appl. No.: 621,113

[22] Filed: Nov. 30, 1990

[51] Int. Cl.$^5$ .............................................. C09F 1/00
[52] U.S. Cl. ................................. 530/213; 530/200; 530/215; 524/272
[58] Field of Search ................. 530/200, 213, 215; 524/272

[56] References Cited

U.S. PATENT DOCUMENTS 4,659,514  4/1987  Beuke ................................. 530/215
4,725,384  2/1988  Du Vernet ......................... 524/272
4,775,497  10/1988  Pastor et al. ........................ 530/213
4,788,009  11/1988  Johnson, Jr. ....................... 530/213

Primary Examiner—John Kight, III
Assistant Examiner—Duc Truong
Attorney, Agent, or Firm—Joanne W. Patterson

[57] ABSTRACT

Rosin esters having improved viscosity stability are prepared by heating a mixture of rosin and a polyol in the presence of a catalyst mixture of 0.1% to 0.6% by weight calcium bis(ethyl 3,5-di-t-butyl-4-hydroxybenzyl phosphonate) and 0.02 to 1.0% by weight of a second calcium compound selected from calcium carbonate, calcium oxide and a calcium salt of an aliphatic carboxylic acid, all percentages being based on the weight of rosin.

9 Claims, No Drawings

USE OF A MIXED CATALYST SYSTEM TO IMPROVE THE VISCOSITY STABILITY OF ROSIN RESINS

FIELD OF THE INVENTION

This invention relates to a process for improving the viscosity stability of rosin esters.

BACKGROUND OF THE INVENTION

Although the use of calcium hydroxybenzyl phosphonate for catalyzing the esterification of rosin with polyols is known to improve the reaction rate as well as the oxidative stability and color, the ester products suffer from a lack of viscosity stability. Viscosity stability is especially important when the rosin esters are used as tackifiers in hot melt adhesives. It has been shown that an increase in viscosity of 25-30% occurs when a typical formulation comprising a 1/1/1 mixture of ethylene/vinyl acetate//wax//rosin ester is held at 177° C. for 96 hours. While a change in viscosity of + or −10% might be tolerated, an increase in viscosity of 25-30% causes problems with movement of the adhesive through the processing equipment.

U.S. Pat. No. 4,725,384 discloses a process for preparing rosin esters used as tackifiers for hot melt adhesive formulations that are said to have improved clarity and viscosity stability. A combination of phosphinic acid and a phenol sulfide is used as the esterification catalyst and a magnesium salt of an organic acid is added to neutralize the acidity of the esterified rosin. However, the "improved" composition still shows a 26% change in viscosity after aging at 175° C. for 72 hours.

SUMMARY OF THE INVENTION

The process of this invention produces a rosin ester that is not only light in color and oxidatively stable, but also stable to changes in viscosity. In a process for preparing a rosin ester having improved viscosity stability wherein rosin is esterified by heating a mixture of rosin and a polyol in the presence of a catalyst, the improvement comprises esterifying the rosin in the presence of a catalyst mixture of 0.1% to 0.6% by weight calcium bis(ethyl 3,5-di-t-butyl-4-hydroxybenzyl phosphonate) and 0.02 to 1.0% by weight of a second calcium compound selected from calcium carbonate, calcium oxide and a calcium salt of an aliphatic carboxylic acid, all percentages being based on the weight of rosin.

DETAILED DESCRIPTION OF THE INVENTION

Rosin is mainly a mixture of $C_{20}$ fused ring, monocarboxylic acids, typified by levopimaric and abietic acids, both of which are susceptible to numerous chemical transformations. The rosins to which this invention relates include gum rosin, wood rosin, and tall oil rosin. The gum, wood, or tall oil rosin can be subjected to other treatments prior to esterification. For example, in addition to extraction processes, the rosin can be subjected to disproportionation, hydrogenation or polymerization, or some combination of these and/or other treatments.

Suitable polyhydric alcohols that can be used for esterifying the rosin include, for example, ethylene glycol, propylene glycol, diethylene glycol, triethylene glycol, tetraethylene glycol, trimethylene glycol, glycerol, pentaerythritol, dipentaerythritol, tripentaerythritol, trimethylolethane, trimethylolpropane, mannitol and sorbitol as well as combinations thereof and other similar polyhydric alcohols. Pentaerythritol, glycerol and trimethylolpropane are preferred.

The rosin esters are typically prepared by reacting the rosin with the polyol under an inert atmosphere at a temperature of from about 250° C. to about 290° C., preferably 270°–280° C. The reaction is carried out in the presence of a catalyst mixture of 0.1% to 0.6% by weight, preferably 0.15 to 0.3%, calcium bis(ethyl 3,5-di-t-butyl-4-hydroxybenzyl phosphonate), hereafter referred to as calcium hydroxybenzyl phosphonate, and 0.02% to 1.0% by weight, preferably 0.05 to 0.30%, of a second calcium compound selected from calcium carbonate, calcium oxide and calcium salts of aliphatic organic acids such as, for example, formic, adipic, acetic, propionic, butyric, valeric, caproic, stearic, oleic and linoleic acids. Calcium formate is preferred. All percentages are based on the weight of rosin. When calcium formate is used, the ratio of calcium compounds is maintained at 1.0 to 2.5 moles calcium formate per mole of calcium hydroxybenzyl phosphonate. The phosphonate is commercially available as IRGANOX® 1425 from Ciba-Geigy Corporation. The esterification reaction is continued until the acid number reaches 20-40, at which point steam and/or vacuum stripping is initiated. The stripping is continued until the acid number drops to 10 or below.

A disproportionating agent can also be present in the reaction mixture. Disproportionating agents for rosin are well known in the art and include, for example, aryl sulfides such as the phenol sulfides described in U.S. Pat. No. 4,657,703.

The rosin color standards used in the following examples are the United States rosin grade (USRG) standards that vary from XC (lightest) through XB, XA, X, WW, WG, N, M, K, I, H, G, F, E and D (darkest).

COMPARATIVE EXAMPLE

Tall oil rosin (500 g), 57.9 g pentaerythritol, 1.5 g SANTONOX® disproportionating agent (Monsanto) and 1.25 g calcium hydroxybenzyl phosphonate are added to a suitable reaction vessel equipped with a heating mantle, stirrer, thermometer and condenser into which a $CO_2$ tube is introduced. A standard antioxidant package of hindered phenol plus phosphite is added after heating and stirring at 280° C. for 5 hours until an acid number of 27 is reached, followed by vacuum treatment (27-29 inches) for two hours. The product is a clear yellow resin with an acid number of 13.5, a Ring and Ball softening point (R&B) of 102° C., a USRG color of XA4 and a Yellowness Index of 71. When the rosin ester is used in a 1/1/1 ethylene/vinyl acetate (EVA)//wax//resin formulation, the viscosity increase is 28.8% with no skinning after heating at 177° C. (350° F.) for 96 hours. "Skinning" is the formation of a film on top of the formulation due to oxidation.

EXAMPLE 1

The procedure described in the Comparative Example is repeated except that 0.07% calcium formate with respect to the rosin is added to the esterification charge. The resulting pentaerythritol rosin ester has a color of XB4, an acid number of 12.9, and an R&B of 101.4° C. When the rosin ester is used in the EVA formulation described above, the viscosity increase is 11.5% with no skinning after heating at 177° C. for 96 hours.

EXAMPLE 2

The procedure described in the Comparative Example is repeated except that 0.14% calcium formate is added to the esterification charge. The resulting ester has a color of XB2, an acid number of 5, and an R&B of 106.5° C. When the rosin ester is used in the EVA formulation described above, the viscosity change is −5% with no skinning after heating at 177° C. for 96 hours.

EXAMPLE 3

The procedure described in the Comparative Example is repeated except that 0.28% calcium formate is added to the esterification charge. The resulting ester has a color of XB0, an acid number of 6.4 and an R&B of 105.2° C. When the rosin ester is used in the EVA formulation described above, the viscosity change is −10% with no skinning after heating at 177° C. for 96 hours.

EXAMPLE 4

The procedure described in the Comparative Example is repeated except that the amount of IRGANOX® 1425 is decreased to 0.15% of the rosin and 0.035% calcium formate is added. The ester product has a color of XA2, an acid number of 7.4 and an R&B of 100.2° C. When the rosin ester is used in the EVA formulation described above, the viscosity change is +24% with no skinning after heating at 177° C. for 96 hours.

EXAMPLE 5

The procedure of Example 4 is repeated except that the amount of calcium formate is increased to 0.07% of the rosin. The ester has a color of XA2, an acid number of 6.3 and an R&B of 100.5° C. When the rosin ester is used in the EVA formulation described above, the viscosity change is 0% with no skinning after heating at 177° C. for 96 hours.

The results of these experiments are summarized in Table 1.

TABLE 1

| EXAMPLE | WT. % IRGANOX® 1425 | WT. % Ca FORMATE | % VISCOSITY CHANGE |
| --- | --- | --- | --- |
| A | 0.3 | 0.0 | +28.8 |
| 1 | 0.3 | 0.07 | +11.5 |
| 2 | 0.3 | 0.14 | −5.0 |
| 3 | 0.3 | 0.28 | −10.0 |
| 4 | 0.15 | 0.035 | +24.0 |
| 5 | 0.15 | 0.07 | 0.0 |

I claim:

1. In a process for preparing a rosin ester having improved viscosity stability wherein rosin is esterified by heating a mixture of rosin and a polyol in the presence of a catalyst, the improvement comprising esterifying the rosin in the presence of a catalyst mixture of 0.1% to 0.6% by weight calcium bis(ethyl 3,5-di-t-butyl-4-hydroxybenzyl phosphonate) and 0.02% to 1.0% by weight of a second calcium compound selected from calcium carbonate, calcium oxide and a calcium salt of an aliphatic carboxylic acid, all percentages being based on the weight of rosin.

2. The process of claim 1 wherein the rosin is tall oil rosin.

3. The process of claim 1 wherein the second calcium compound is calcium formate.

4. The process of claim 2 wherein the second calcium compound is calcium formate.

5. The process of claim 3 wherein the ratio of catalyst components is 1.0–2.5 moles calcium formate per mole calcium bis(ethyl 3,5-di-t-butyl-4-hydroxybenzyl phosphonate).

6. The process of claim 4 wherein the ratio of catalyst components is 1.0–2.5 moles calcium formate per mole calcium bis(ethyl 3,5-di-t-butyl-4-hydroxybenzyl phosphonate).

7. The process of claim 1 wherein the polyol is pentaerythritol, glycerol or trimethylolpropane.

8. The process of claim 2 wherein the polyol is pentaerythritol, glycerol or trimethylolpropane.

9. The process of claim 1 wherein the rosin is tall oil rosin, the polyol is pentaerythritol, and the second calcium compound is calcium formate.

* * * * *